Sept. 12, 1933.　　W. G. HOELSCHER　　1,926,998
LUBRICATION APPARATUS FOR TRANSMISSIONS
Filed March 17, 1933　　3 Sheets-Sheet 2

INVENTOR
William G. Hoelscher
BY
Wood & Wood
ATTORNEYS

Sept. 12, 1933.  W. G. HOELSCHER  1,926,998
LUBRICATION APPARATUS FOR TRANSMISSIONS
Filed March 17, 1933   3 Sheets-Sheet 3

INVENTOR
William G. Hoelscher
BY
Word & Word
ATTORNEYS

Patented Sept. 12, 1933

1,926,998

UNITED STATES PATENT OFFICE 1,926,998

LUBRICATION APPARATUS FOR TRANSMISSIONS

William G. Hoelscher, Norwood, Ohio, assignor to The American Tool Works Company, Cincinnati, Ohio, a corporation of Ohio Application March 17, 1933. Serial No. 661,364

11 Claims. (Cl. 184—6)

This invention relates to lubrication and is particularly directed to a lubrication apparatus and system for transmissions. In transmission gearing installations there are always a multiplicity of bearings to be oiled due to the number of shafts employed and these bearings are scattered throughout the transmission casing. In some instances such as headstock gearing the points to be lubricated are more scattered than in others and the disadvantage of and necessity for long conduits is more apparent, particularly in the case of a gravity feed system where the oil is delivered to a reservoir above the transmission and flows from the reservoir to the various points.

It is an object of the present invention to provide an improved lubrication apparatus for a transmission gearing in which the reservoir from which the oil distributes by gravity is extended over a considerable area above the transmission and in relation to the multiplicity of bearings whereby the necessity for long conduits is eliminated. Moreover the purpose of the extended reservoir is to provide that the conduits extend more directly vertically than would be the case in the instance of a localized reservoir.

It is a further object of this invention to provide an improved reservoir construction for a gravity feed system which is incorporated as a part of the gear shifting lever support, thereby eliminating an unnecessary part and because of the distribution of the lever fulcrums accomplishing the extended form of reservoir of this invention, the reservoir moreover by the relation of the fulcrums of the shifting levers positively accomplishing lubrication of these fulcrums without the use of conduits or extraneous means of any sort.

It is a still further object to provide a pump mounting and connection of power thereto which does not entail additional gears or transmission means and through which power connection the pump is driven at a uniform speed and constantly while the transmission is being utilized.

Other objects and further advantages will be more fully apparent from a description of the accompanying drawings, in which.

Figure 1:
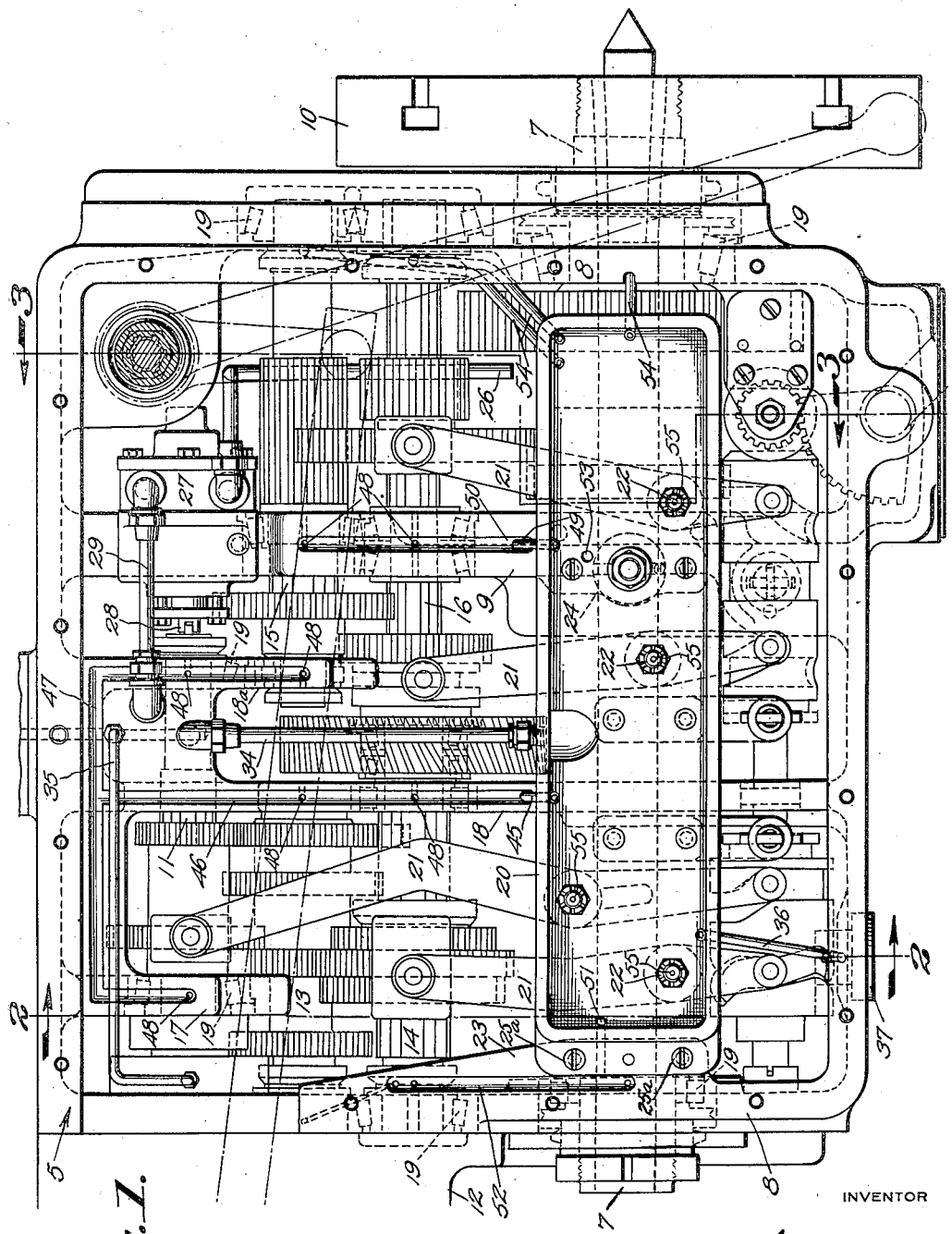
Figure 1 is a top plan view of a lathe headstock with the cover removed for the purpose of illustrating, in a general manner, the lubrication apparatus and system.
Figure 2:
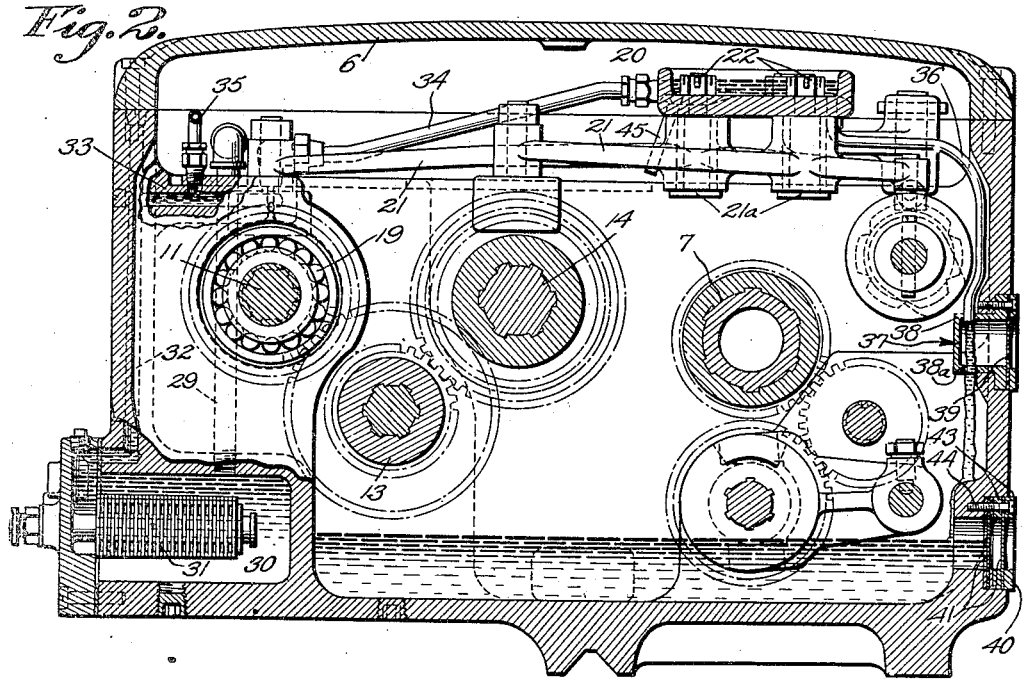
Figure 2 is a sectional view taken on line 2—2, Figure 1, showing portions of the system in detail.

The improved lubrication system has been shown applied to a lathe headstock for the purpose of oiling all the bearings and lever pivots thereof. The arrangement of gears and number of shift levers or synchronization of shifts is of no importance in the present case and the gear train shown is only of importance as typical environment for the system. The headstock transmission described and claimed in the co-pending application of William G. Hoelscher, filed April 27, 1932, Serial No. 607,827 is shown in the present instance.

Referring specifically to the drawings, the lathe headstock casing is shown at 5 and includes a cover 6 secured thereon. A spindle 7 is journalled in the end walls 8 of the casing and an intermediate wall 9 of the headstock casing and carries a face plate 10 at its exteriorly extended inner end. The headstock gearing incorporated in the casing is driven from a main power shaft 11 extended from a power unit 12, the drive proceeding through a plurality of fixed and shiftable gears and respective shafts to the spindle. For the purpose of generally identifying the shafts, the main power shaft 11 drives an intermediate shaft 13, which shaft in turn drives a further shaft 14, this shaft mounting a gear adapted to connect the drive to the spindle. For providing speed ranges, back gearing is provided which involves two additional shafts, 15, 16, the back gears directing the drives to the spindle.

Toward the outer end of the headstock, the power shaft 11 is journalled in a supporting rib or wall 17 projected from one side of the headstock casing. The next wall 18 extends entirely across the casing and supports the inner end of the intermediate shaft 13 and intermediately supports the further shaft 14, these shafts 13, 14, being supported in the outer end wall 8.

The next wall 18a is in the form of a cross rib projected from the rear wall of the casing and supports the inner end of the power shaft 11 and the inner end of the countershaft 15. The wall 9 extends entirely across the casing for the purpose of supporting the countershaft 15 at an intermediate point and for the purpose of supporting the spindle at an intermediate point. Moreover this wall 9 supports the adjacent inner ends of the further shaft 14 and the countershaft 16. The ends of the shafts 15 and 16 and the spindle 7 are mounted in the inner end wall of the casing. In each instance of support a tapered roller bearing 19 is used.

Oil is delivered to all of the bearings 19 in the cross walls and end walls of the casing by gravity from a lever supporting reservoir element 20 mounted in the upper part of the casing.

Figure 3:
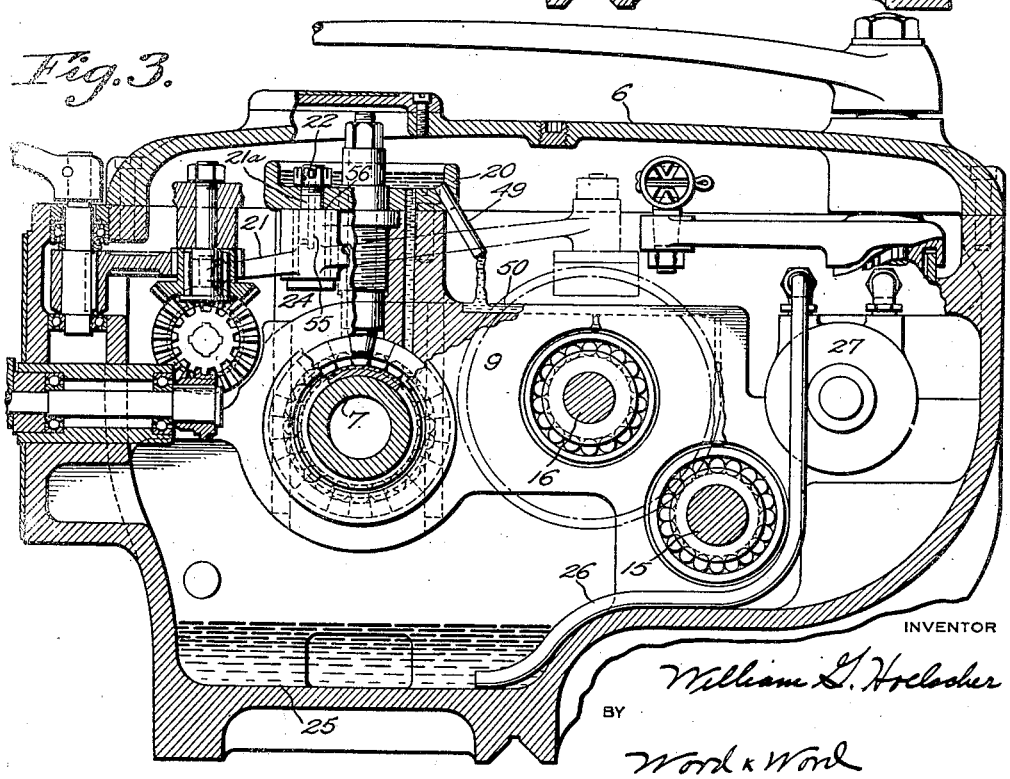
Figure 3 is a sectional view taken on line 3—3, Figure 1, further detailing the system.
Figure 4:
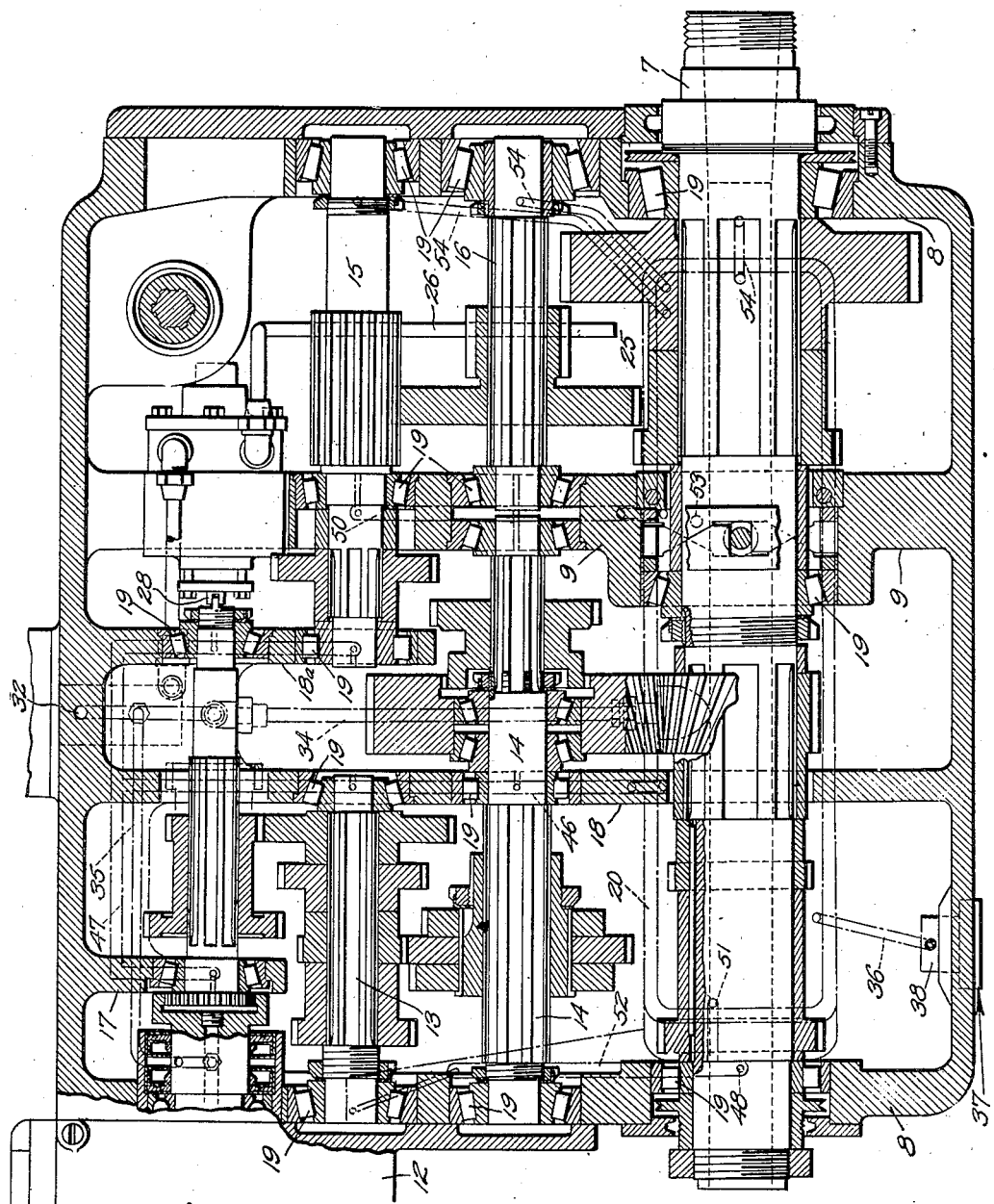
Figure 4 is a horizontal sectional view taken through the various bearings of the transmission.

The gear shifting levers 21 mounted on this element are unimportant as to number and function, it being sufficient to say that the levers shift various gears of the train for delivering a wide range of speeds to the spindle. Each lever is fulcrumed or hung on the plate or dish-shaped reservoir 20 and is adapted to swing in a horizontal plane, the fulcrums being provided in the form of bolts 21ᵃ vertically disposed through the plate and fixed in place by means of nuts 22 (see Figure 3).

The reservoir is mounted on top of an extended inward flange 23 of the outer end wall 8 and on a lug 24 on the top of the cross wall 9 by means of screws 25. The shallow pan-like structure of this plate provides ample and wide spread room for a relatively large quantity of oil insuring a constant supply to the bearings by gravity through a series of ports, grooves and pipe lines.

The sump 25 in which the oil collects as it descends by gravity through the various bearings and thence to the bottom of the casing extends over the lower area of the casing and establishes a single pool of lubricant by virtue of the fact that the cross walls are provided with openings 26 at the lower ends thereof adjacent the floor of the casing.

The oil is drawn upwardly from the sump through an intake pipe 26 having its intake end disposed at the bottom of the sump and connected to the intake of a pump 27 supported on the cross wall of the casing. This pump is coupled by a diametrical tongue and groove connection 28 to the inner end of the power shaft 11 in axial alignment therewith so that it is driven at all times and at a constant speed when power is being imparted to the headstock gearing.

The discharge pipe or oil redelivery pipe 29 extends from the discharge opening of the pump and extends downwardly to a filter chamber 30 in a boss in the lower portion of the headstock casing. A filter unit 31 of standard make is mounted in the filter chamber 30 and a redelivery line continuation extends upwardly in the form of a vertical passageway 32 in the side wall of the headstock casing and turns inwardly through a boss 33 projecting from the side wall of the casing. A pipe 34 extends from the inner end of this passageway to the reservoir 20 and is screwed into the side wall thereof for delivering the returned oil into the reservoir.

Pressure lines may be extended from the return passageway and as shown one pressure conduit 35 is extended from the delivery passageway 32 in the inwardly extended boss and is connected to the power unit 12 for oiling the parts thereof.

For the purpose of indicating oil circulation, a pipe 36 depends from the reservoir and enters into and through the upper side of an indicating device 37 in the nature of a thimble 38 secured through the forward wall of the headstock casing. The lubricant falls through the thimble by way of an opening 38ᵃ in the underside thereof and returns to the sump. The outer open end of the thimble has a glass plate closure 39 whereby the flow of lubricant through the thimble may be observed. An oil level indicator means 40 is shown mounted in the side wall of the headstock casing and consists of spaced glass discs 41 secured across the outer side of an opening 42 by means of a series of collars 43 and screws 44.

The distribution pipes extend downwardly from the reservoir to channels or grooves cut in the upper edges of the respective walls or in some instances extend directly to the bearings. The grooves are arranged so as to receive the oil from the pipes and to extend over the particular bearings, oil passageways being drilled downwardly from the grooves through the wall either extend directly vertically to the bearing or extend at an angle at the side of the walls to permit the oil to flow down upon the shaft bearings.

Describing the oil distribution in detail, a short oil tube 45 is screwed into the underside of the reservoir and extends downwardly for delivering oil into a groove 46 in the cross wall 18. This groove extends along the upper edge of the cross wall toward the rear wall of the headstock and branches both ways longitudinally of the headstock and in the top surfaces of the boss 33 and a connecting rib boss 47 between the cross walls and turns inwardly along the top edges of the walls 17 and 18ᵃ which project from the side of the headstock casing.

Oil holes 48 extend from this groove 46 downwardly to both bearings of the power shaft 11, to the inner bearing of the intermediate shaft 13 and to the intermediate bearing of the further shaft 14 as well as the inner bearing of the countershaft 15. These oil holes 48 may either extend directly to the bearing receiving bores in the walls or pass laterally out the side of the walls to permit the oil to flow down the side of the wall and onto the shaft adjacent the bearing.

Another short delivery tube 49 extends downwardly from the reservoir and delivers the oil to one end of a groove 50 along the top wall of the main cross wall 9. This groove extends over the bearings for the adjacent inner ends of the further shaft 14 and the countershaft 16 as well as the intermediate bearing of the countershaft 15, oil passageways 48 extending downwardly from the grooves to the particular bearings. At the outer end of the headstock casing a hole 51 is drilled through the bottom of the reservoir and through the supporting lug permitting the oil to flow into one end of a groove 52 disposed along the upper edge of the outer end wall and over the outer bearings to the further shaft 14 and the spindle, oil passageways 48 extending downwardly from the groove to these particular bearings and a passage 48ᵃ extending through the wall to the bearing at the outer end of the intermediate shaft 13.

The intermediate bearing of the spindle is supplied with oil by way of a drilled passageway 53 extending through the reservoir bottom and downwardly through the supporting lug and into the bearing receiving bore of the cross wall 9. Both outer end bearings of the countershafts 15, 16 and the other outer bearing of the spindle are supplied with oil by means of tubes 54 extending from the reservoir downwardly and connecting to the bosses supporting the particular bearings.

The lever fulcrums are lubricated by means of lubricant flow passageways 55 extending axially downwardly through the bolts 21ᵃ and radially to the bores of the lever fulcrum bosses or hubs. These bolts are rigidly fixed in place since they are drawn against shoulders 56, the levers accordingly swinging on the bolts.

Having described my invention, I claim:

1. In a lubricating apparatus for the headstock of a lathe including the headstock casing, transmission shafts, gears, and gear shifting levers mounted therein; a support for the levers extended substantially the length of the headstock at the upper portion thereof, said support being of pan shape for receiving lubricant and having tubes extending downwardly for delivering lubricant to the various bearings within said casing.

2. In a transmission, a transmission casing, a series of transmission shafts mounted in the casing walls, a series of speed change gears mounted on said shafts, shifting levers for said gears disposed on a horizontal plane, an elongated support for said levers extending the length of said transmission casing and having a recessed upper face, the pivot mountings for said levers being disposed through said support and within said recess, and a series of oil discharge tubes extending downwardly from said recess to the bearings for said shafts.

3. In a transmission of the type having lever shifted gears, a support for the levers of said transmission, said support having a recess in its upper surface, means for supplying lubricant to the recess, and a series of lubricant ducts extending downwardly for gravity feed to the various bearings of the transmission.

4. A lubricating apparatus for the speed change gear transmission of the headstock of a lathe, comprising, a pan-shaped support for the gear shifting levers of said transmission adapted to receive lubricant and having lubricant delivery ducts extending downwardly for delivering lubricant to the various bearings.

5. A lubricating apparatus for the headstock of a lathe, the headstock casing transmission shafts, gears, and gear shifting levers mounted therein; a support for the levers extended substantially the length of the headstock at the upper portion thereof, said support being of pan shape for receiving oil and having tubes extending downwardly for delivering oil to the various bearings, and said levers having fulcrum pins disposed through the bottom of the support, whereby they are lubricated directly from the support.

6. In a transmission, a transmission casing having a series of cross walls therein, a series of transmission shafts mounted in the casing walls and cross walls, a series of speed change gears mounted on said shafts, shifting levers for said gears disposed for movement on a horizontal plane, an elongated support for said levers disposed longitudinally of said casing and extending substantially the length thereof, said support having a recessed upper face, the pivot mountings for said levers being disposed through the bottom of said support and within said recess, grooves extending along the top edges of the walls of said transmission, and oil discharge tubes extending downwardly from said recess to the respective grooves.

7. A lubricating apparatus for a speed change gear transmission, comprising, a pan-shaped elongated lubricant reservoir element supported above said transmission, gear shifting levers mounted on said reservoir element, and a series of lubricant ducts extending from said reservoir to the various bearings of the transmission.

8. In a lathe headstock transmission, a headstock casing having cross walls therein, transmission shafts and speed change gearing mounted in said casing, a spindle supported in the end walls and a cross wall of said casing and driven by said gearing, an elongated pan-shaped support element mounted longitudinally of said headstock casing, said support element pivotally mounting a series of gear shifting levers, the fulcrum pins of which are disposed through the bottom thereof, means for supplying oil to said pan-shaped element, oil grooves and ducts formed in the walls of the casing, said pan-shaped element including outlets to the oil grooves and ducts for lubricating the bearings of the spindle and the transmission shafts.

9. In a lathe headstock transmission, a headstock casing having a cross wall therein, transmission shafts and speed change gearing mounted in said casing, a spindle supported in the end walls and cross wall of said casing and driven by said gearing, an elongated pan-shaped support element mounted longitudinally of said headstock casing above said spindle, said support element pivotally mounting a series of gear shifting levers, the fulcrum pins of which are disposed through the bottom thereof, means for supplying oil to said pan-shaped element, and a series of oil ducts extending downwardly substantially vertically from the pan-shaped element for lubricating the bearings of the spindle.

10. In a speed change gear transmission including a casing and levers for shifting said gears, a support for the levers of said transmission extending substantially the length of said casing, said support having a recessed upper surface for containing oil, and a series of oil conduits extending from said recessed upper surface downwardly to the various bearings of the transmission.

11. In a lathe headstock transmission, a headstock casing having cross walls therein, transmission shafts and speed change gearing mounted in said casing, an elongated pan-shaped support element mounted longitudinally of said headstock casing, said support element pivotally mounting a series of gear shifting levers, the fulcrum pins of which are arranged in a row longitudinally of said support element and disposed through the bottom thereof, and said support element including outlets extending downwardly from the pan-shaped element for lubricating the bearings of the shafts.

WILLIAM G. HOELSCHER.